(12) United States Patent
Akamatsu et al.

(10) Patent No.: US 8,228,509 B2
(45) Date of Patent: Jul. 24, 2012

(54) SHAPE MEASURING DEVICE

(75) Inventors: Masaru Akamatsu, Kobe (JP);
Hidehisa Hashizume, Kobe (JP);
Yasuhide Nakai, Kobe (JP)

(73) Assignee: Kobelco Research Institute, Inc., Kobe-Shi (JP)

( * ) Notice: Subject to any disclaimer, the term of this patent is extended or adjusted under 35 U.S.C. 154(b) by 195 days.

(21) Appl. No.: 12/745,546

(22) PCT Filed: Dec. 2, 2008

(86) PCT No.: PCT/JP2008/071902
§ 371 (c)(1),
(2), (4) Date: May 30, 2010

(87) PCT Pub. No.: WO2009/072500
PCT Pub. Date: Jun. 11, 2009

(65) Prior Publication Data
US 2010/0302551 A1 Dec. 2, 2010

(30) Foreign Application Priority Data
Dec. 3, 2007 (JP) ................................ 2007-312034

(51) Int. Cl.
*G01B 11/00* (2006.01)
(52) U.S. Cl. ...................................................... 356/610
(58) Field of Classification Search .................. None
See application file for complete search history.

(56) References Cited

U.S. PATENT DOCUMENTS

| 5,555,091 | A | 9/1996 | Kagamida |
| 6,097,492 | A * | 8/2000 | Kondo et al. .................. 356/614 |
| 2003/0169916 | A1 | 9/2003 | Hayashi et al. |
| 2006/0109484 | A1 | 5/2006 | Akamatsu |

FOREIGN PATENT DOCUMENTS

| JP | 4-128605 | 4/1992 |
| JP | 7-218228 | 8/1995 |
| JP | 9-229638 | 9/1997 |
| JP | 2000-084811 | 3/2000 |

(Continued)

OTHER PUBLICATIONS

International Search Report for International Application No. PCT/JP2008/071902.

(Continued)

*Primary Examiner* — Tu Nguyen
(74) *Attorney, Agent, or Firm* — Ditthavong Mori & Steiner, P.C.

(57) ABSTRACT

A shape measuring device including a light projecting device for projecting a light flux to a measurement portion, and image pickup device for picking up a projection image of the measurement portion. The light projecting device includes a collimator lens having outgoing light of a point light source pass and collimating the same in a light projection direction and one or more apertures shielding passage of light in a range outside an image pickup range or passage of light in a range inside the image pickup range and outside a boundary located in a range outside a projection image of a measurement portion. Moreover, a parallel supporting portion for supporting a face of the measurement target in parallel with the light projection direction at a position on the center side with respect to the measurement portion in the measurement target supported by a center sucking and supporting mechanism is provided.

9 Claims, 17 Drawing Sheets

FOREIGN PATENT DOCUMENTS

| | | |
|---|---|---|
| JP | 2003-243465 | 8/2003 |
| JP | 2005-188955 | 7/2005 |
| JP | 2006-145487 | 6/2006 |
| JP | WO 2006/112530 | 10/2006 |
| JP | 2007-240264 | 9/2007 |

OTHER PUBLICATIONS

Two Office Actions issued by Japanese Patent Office corresponting to International Application No. PCT/JP2008/070257.

* cited by examiner

WAVY LINE IS OUTLINE OF MEASUREMENT PORTION PROJECTION IMAGE

OPENING PORTION OF APERTURE 8o (8o2)

WAVY LINE IS OUTLINE OF MEASUREMENT
PORTION PROJECTION IMAGE

FIG. 6
(a)
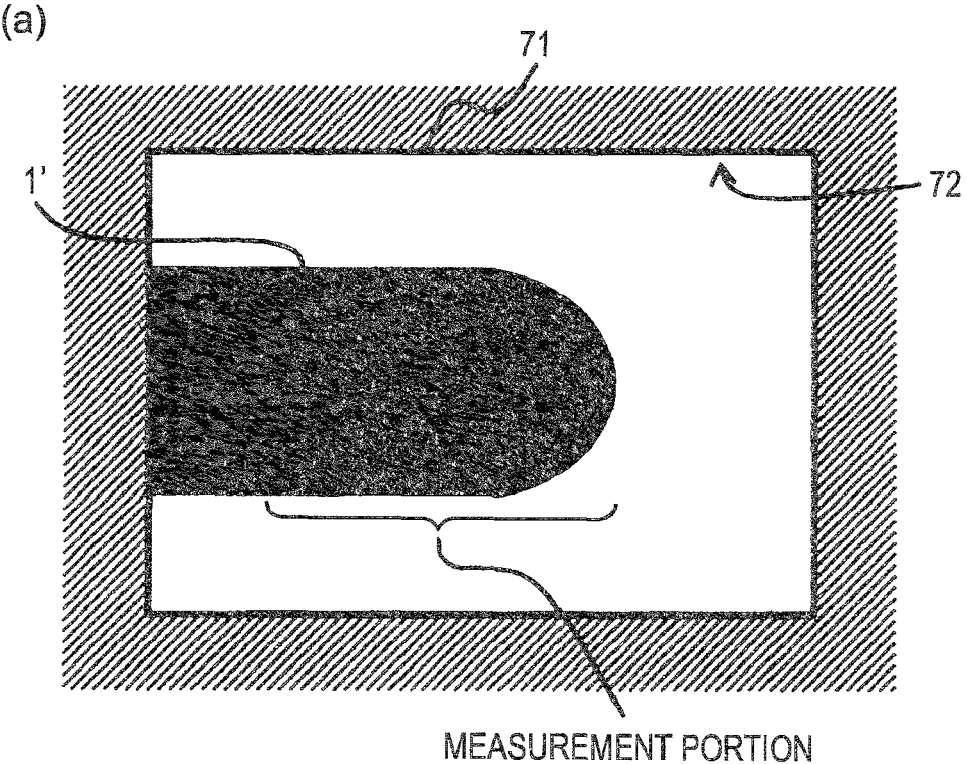
MEASUREMENT PORTION
(b)
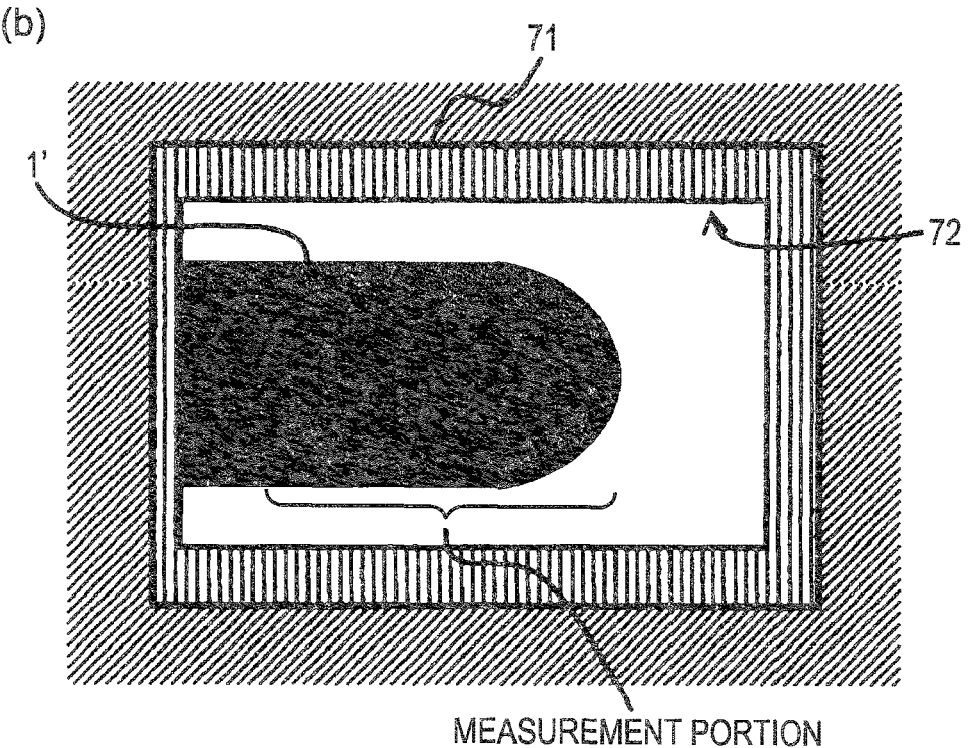
MEASUREMENT PORTION

FIG. 7
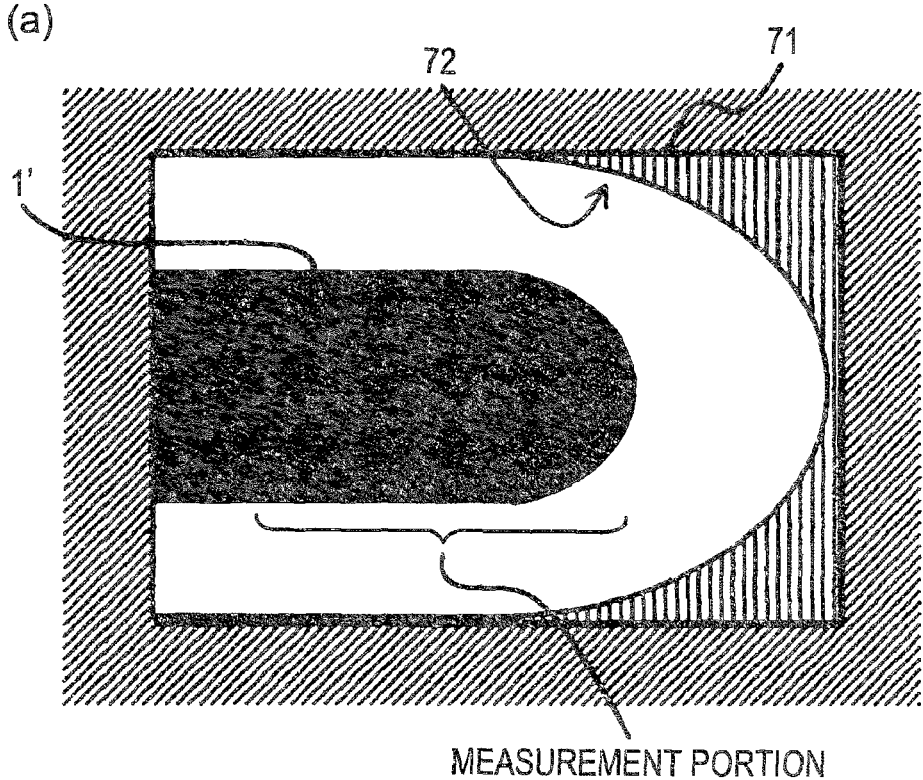
MEASUREMENT PORTION
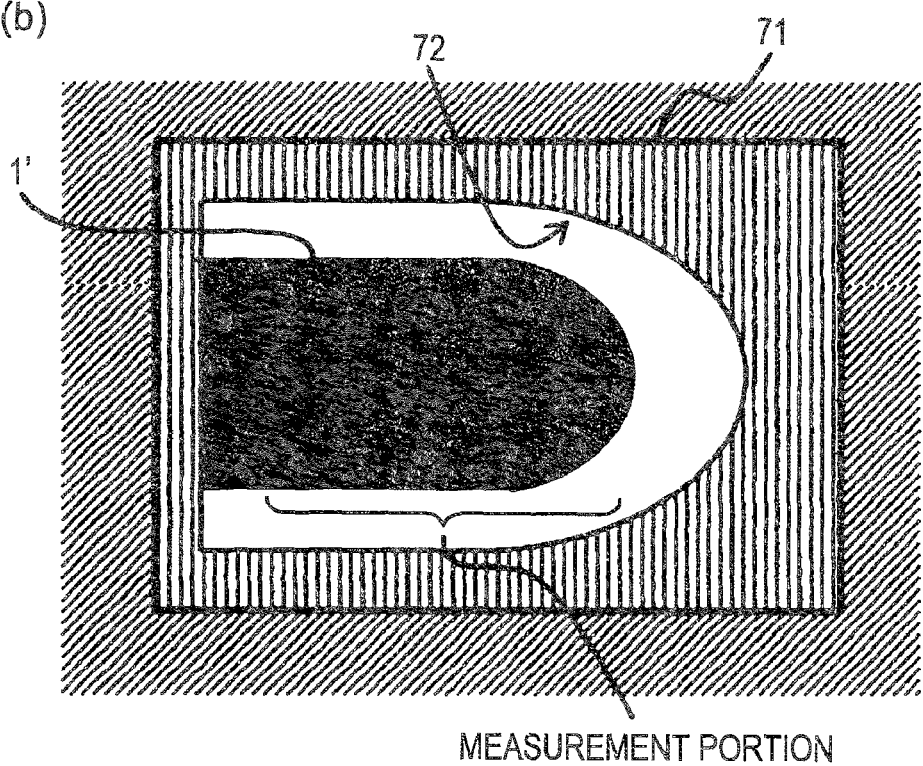
MEASUREMENT PORTION

FIG. 8
(a)
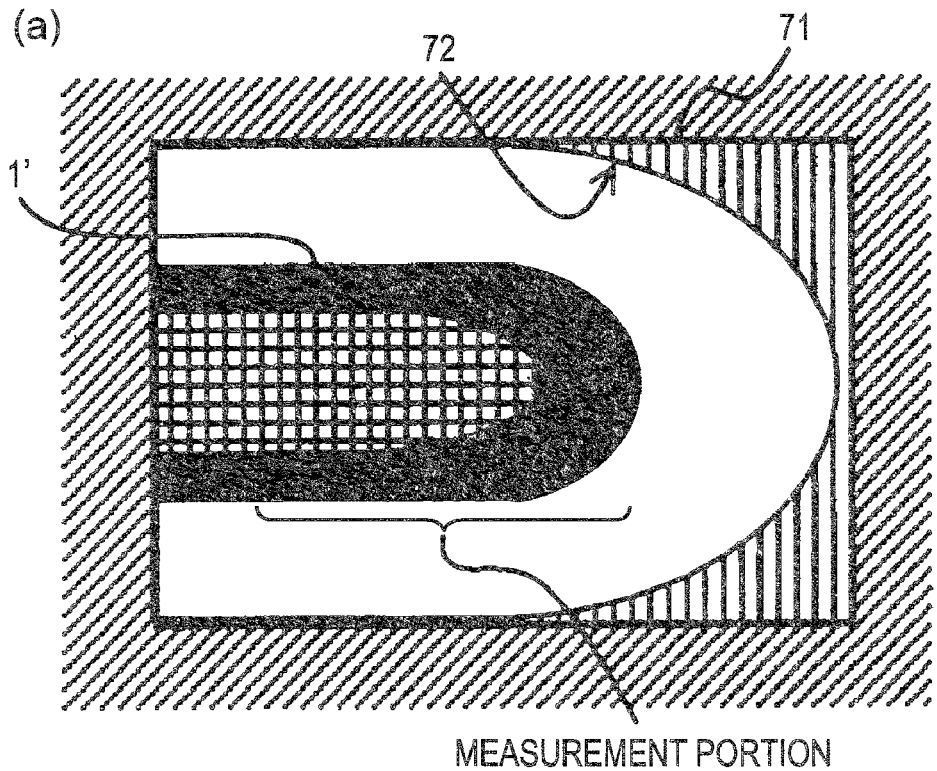
MEASUREMENT PORTION
(b)
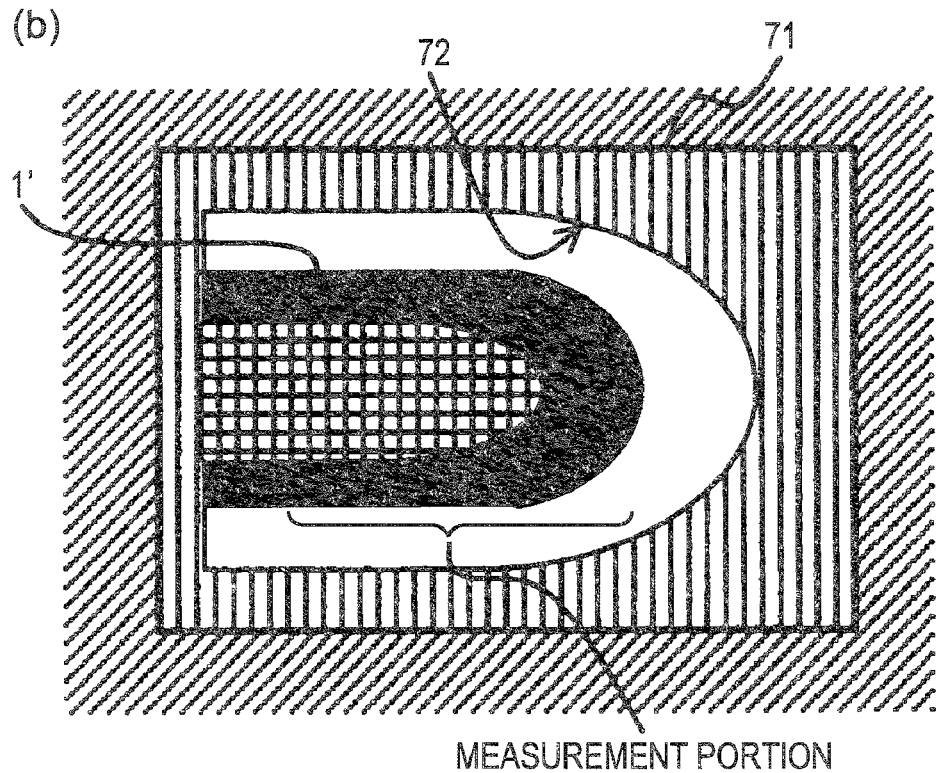
MEASUREMENT PORTION

FIG. 9
(a)
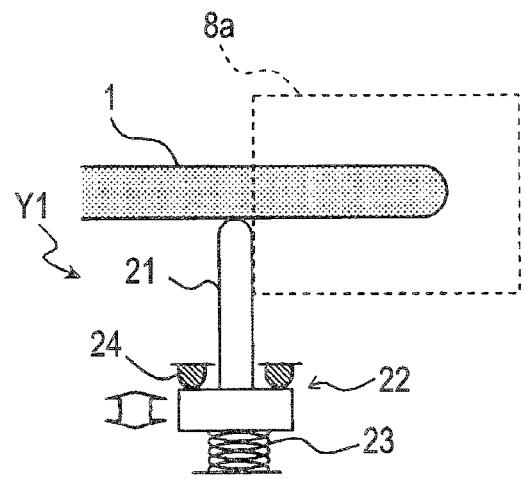
(b)
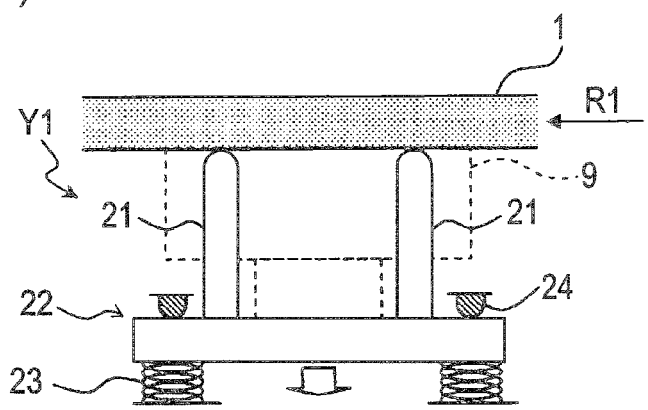
(c)
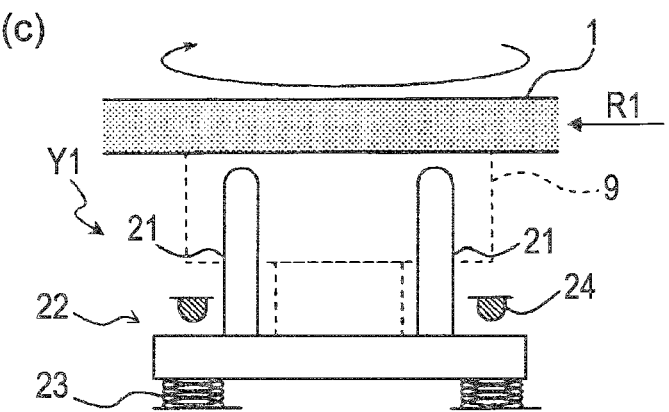

FIG. 10
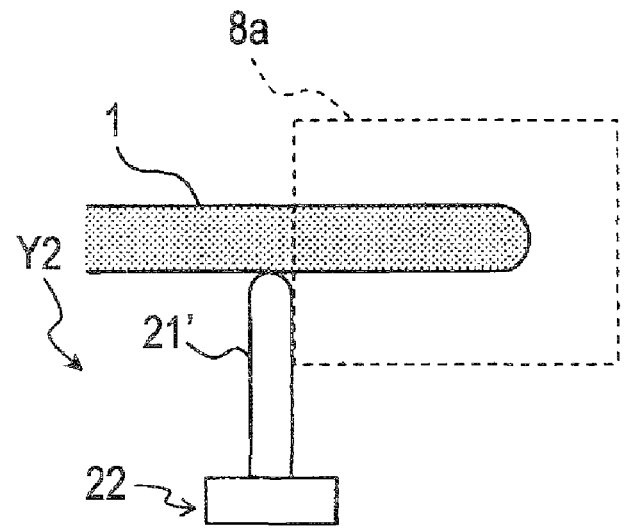
(a)
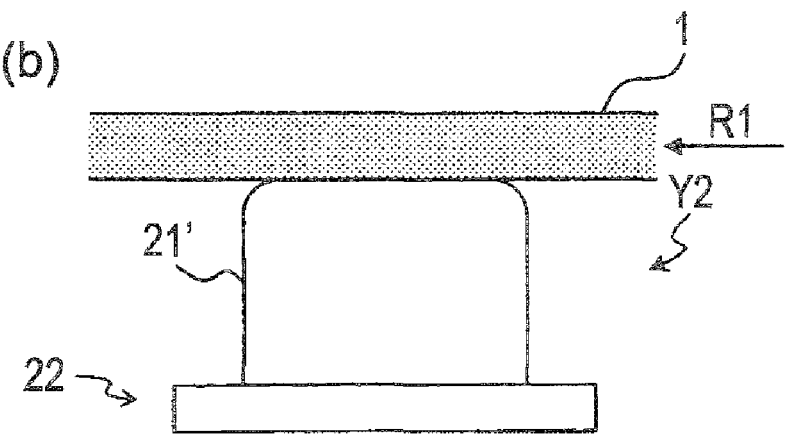
(b)
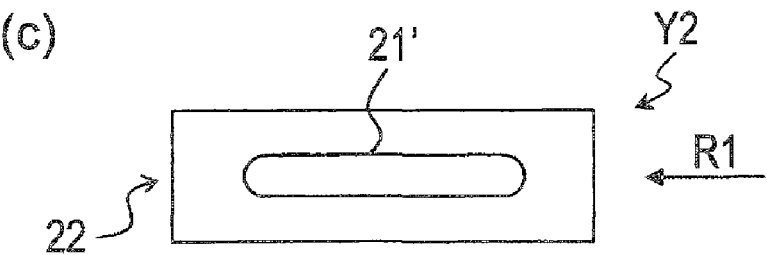
(c)

FIG. 11
(a)
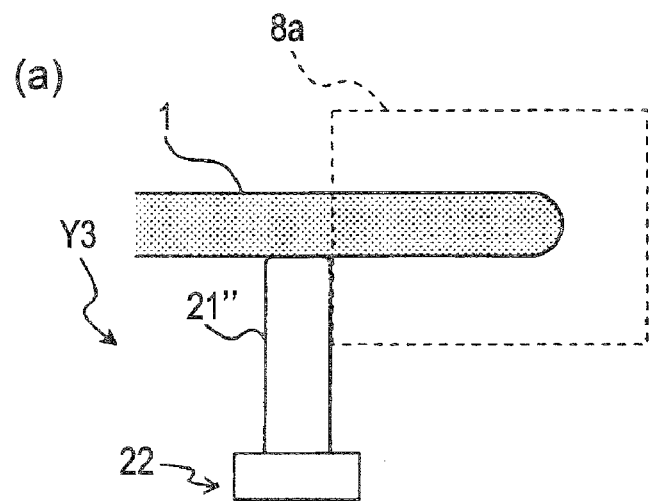
(b)
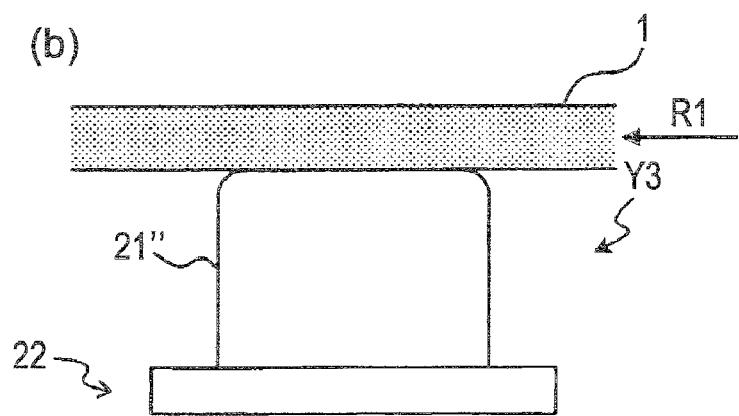
(c)
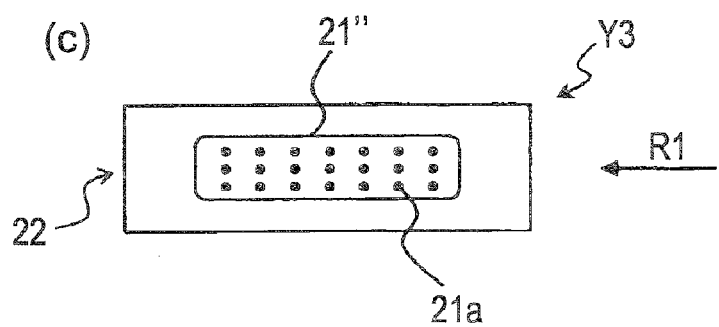

SHAPE MEASURING DEVICE

TECHNICAL FIELD

The present invention relates to a shape measuring device for measuring a shape of a face (end face) of a chamfered end portion of a disc-shaped measurement target (mainly a semiconductor wafer, an aluminum substrate for a hard disk, a glass substrate and the like) on the basis of its projection image.

BACKGROUND ART

In manufacture of a semiconductor wafer (hereinafter referred to as a wafer) or in device manufacture using a wafer, an end portion (edge portion) of the wafer might be damaged or chipped by contact with another component or a wafer holding member. Moreover, the wafer might be split off due to the damage or chipping. The damage or chipping can be caused easily in an end portion of a wafer probably because of a shape of the wafer end face (so-called edge profile portion). Thus, it is important to correctly measure the edge profile of a disc-shaped measurement target represented by a wafer. The shape of the end face here refers to a profile in a thickness direction of the wafer (one dimensional direction), that is, a shape of a section in the thickness direction and hereinafter referred to as an edge profile.

A typical example of the measurement method of the edge profile is a nondestructive test method (SEMI-MF-928-0305 standard Method B) defined by Semi Standard, which is a standard determined by an industrial organization for semiconductor manufacturing devices/materials, Semiconductor Equipment and Materials International (hereinafter referred to as SEMI). In this nondestructive test method, light is projected to a chamfered end portion of a disc-shaped wafer from a direction substantially parallel to each face of the front and back sides of the wafer (first direction), a projection image of the wafer end face is picked up by a camera from a direction opposite the light projecting direction, and the shape of the wafer end face is measured on the basis of the projection image (hereinafter referred to as a light projection measuring method). An outline of the projection image obtained by the light projection measuring method represents a sectional shape of the wafer end face (shape of a section cut off in the thickness direction).

For example, Patent Document 1 proposes prevention of blurring of an outline or occurrence of a diffraction fringe in the projection image by having outgoing light of a point light source pass through a collimator lens and collimated (made into parallel light) and by projecting the light flux to the measurement target in the light projection measuring method.

As mentioned above, in order to make shape measurement with accuracy by the light projection measuring method, a light flux parallel to each face of the front and back sides needs to be projected to a plate-shaped measurement target. Patent Document 1: Japanese Unexamined Patent Application Publication No. 2006-145487

PROBLEM TO BE SOLVED BY THE INVENTION

However, though a collimator lens is an effective optical system in generation of parallel light, a light flux after passing the same is not necessarily a fully parallel light made up only of a parallel light component and can contain a slight non-parallel light component (hereinafter referred to as a non-parallel light component).

FIGS. 15 and 16 are diagrams schematically illustrating a path of a light beam when the non-parallel light component is contained in a light flux projected to a measurement target in the light projection measuring method. FIG. 15 is a diagram of a section in an end portion (measurement portion) of a disc-shaped wafer 1, which is a measurement target, seen from a direction perpendicular to the section (radial direction of the wafer 1), and FIG. 16 is a diagram of the end portion (measurement portion) of the wafer 1 seen from a direction perpendicular to the front and back sides. In FIGS. 15 and 16, reference character R1 denotes a light projection direction (direction of a parallel light component Lp) of the light flux to the wafer 1. Also, a camera, not shown, is arranged so as to be directed to the light projection direction R1 and picks up a projection image of the wafer 1.

In the light flux projected to the measurement target, the parallel light component Lp forms a projection image representing a correct outline shape of the wafer 1, but as shown in FIGS. 15 and 16, a non-parallel light component Ln becomes light entering the camera directly or after being reflected on the surface (each face of the front and back sides and an end face) of the wafer 1 and causes blurring of the outline or occurrence of diffraction fringes in the projection image, which is a problem.

Also, even if the non-parallel light component can be fully eliminated from the light flux projected to the wafer, if parallelism between the light projection direction and each face of the front and back sides of the measurement portion in the measurement target is not sufficient, that is, if each face of the front and back sides of the measurement portion is inclined with respect to the light projection direction, such a situation can occur that a correct shape measurement cannot be made by the light projection measuring method (shape measurement based on a projection image), which is a problem. Particularly, a measurement target like a wafer with a small thickness might have a slight deflection (curved shape) due to variation in manufacture, gravity and the like, and the deflection can cause inclination of the measurement portion with respect to the light projection direction.

FIG. 17 is a diagram schematically illustrating a path of a light beam when there is inclination between the light projection direction R1 to the measurement target and each face of the front and back sides of the measurement portion in the measurement target in the light projection measuring method. FIG. 17 is a diagram of a section in the end portion (measurement portion) of the disc-shaped wafer 1, which is a measurement target, seen from a direction (radial direction of the wafer 1) perpendicular to its section.

As shown in FIG. 17, if there is inclination between the light projection direction R1 and each face of the front and back sides of the measurement portion, a projection image picked up by the camera becomes larger than the original projection image and has a shape totally different from the original projection image.

Therefore, the present invention was made in view of the above circumstances and has an object to provide a shape measuring device that can prevent a non-parallel light component from being contained in a light flux projected to a measurement target as much as possible when a shape of an end face of a disc-shaped measurement target like a semiconductor wafer is to be measured on the basis of a projection image thereof and moreover, capable of ensuring a parallel state between the light projection direction and each faces of the front and back sides of the measurement target and making correct shape measurement.

MEANS FOR SOLVING THE PROBLEM

In order to achieve the above object, a shape measuring device according to the present invention is to measure a shape of an end face of a disc-shaped measurement target such as a semiconductor, for example, and is provided with each constituent element shown in the following (1) to (5). The constituent elements shown in (3) to (5) are provided in light projecting means shown in (1).

(1) Light projecting means for projecting a light flux to a measurement portion, which is an end portion of a disc-shaped measurement target (a chamfered portion, in general) such as a semiconductor wafer or the like, for example, from a direction parallel with each face of front and back sides of the measurement target.

(2) Image pickup means for picking up a projection image of the measurement portion from a direction opposite the light projection direction by the light projecting means.

(3) Point light source.

(4) A collimator lens for having outgoing light from the point light source pass and for collimating it in the light projection direction.

(5) A single or plural masks for shielding a part of passage of the light flux from the collimator lens to the measurement target side and shielding passage of light in a range outside an outline of an image pickup range of the image pickup device when seen from the light projection direction (hereinafter referred to as a range outside image pickup).

The image pickup range is a range corresponding to an entire image region of a picked up image by the image pickup means, that is, a range corresponding to an entire image region which can be a target of image processing for shape measurement.

As shown in FIGS. 15 and 16, if a non-parallel light component is contained in a light flux projected to a measurement target, the non-parallel light component passes a position relatively largely departed from the range of the projection image of the measurement target in a process from the light source to the measurement target in many cases. Therefore, in a process from the collimator lens to the measurement target, by shielding the light passage at a position relatively largely departed from the range of the projection image of the measurement target by the mask, the non-parallel light component can be prevented from being contained in the light flux projected to the measurement target as much as possible.

Also, if the non-parallel light component is contained in the light flux projected to the measurement target, a part of the non-parallel light component might pass a position in the range of the projection image of the measurement target when seen from the light projection direction in the process from the collimator lens to the measurement target and reach the image pickup range after that.

Thus, in the shape measuring device according to the present invention, the mask can shield the light passage also in a part of the range inside the projection image of the measurement portion in the light projection direction (hereinafter referred to as a range inside the projection image) in the light flux passing through the collimator lens and traveling toward the measurement target side.

Moreover, the mask can shield the light passage also in the edge portion range inside the image pickup, which is a range from an outline of the image pickup range to a line formed with a distance outside the outline of the projection image of the measurement portion in the light projection direction, in the light flux passing through the collimator lens and traveling toward the measurement target side.

Also, if the mask is a member provided with a cylindrical opening portion having light pass, there can be nonconformity that the light flux traveling toward the measurement target is reflected and scattered by an inner face of the opening portion.

Thus, the mask can be a plate-shaped member arranged between the collimator lens and the measurement target and having an opening portion formed within the image pickup range and shield passage of a light flux in the range outside the opening portion (that is, the light flux reaching a portion outside the range occupied by the opening portion). Since such mask has a small thickness in the edge portion of the opening portion (a dimension in the light projection direction is small), the light flux toward the measurement target is rarely reflected.

Also, as a specific example of the plate-shaped mask shielding the light passage in the range outside the image pickup, in the range inside the projection image, and in the edge portion range inside the image pickup, there can be a mask having an opening portion formed in a curved band shape along the outline of the projection image of the measurement portion in the light projection direction and shielding passage of the light flux in the range outside the opening portion.

As a result, the non-parallel light component can be eliminated from the light flux projected to the measurement target more reliably.

When shape measurement is to be made by the shape measuring device according to the present invention for the measurement portion at a plurality of spots in a circumferential direction of the measurement target, a center part on one face of the measurement target can be rotated while being sucked and supported, by which the measurement portion is positioned so that efficient measurement can be made.

However, if the measurement target having the center part sucked and supported is rotated, parallelism between the light projection direction and each face of the front and back sides of the measurement portion can be insufficient due to deflection or the like of the measurement target. As mentioned above, even if the non-parallel light component is fully eliminated from the light flux projected to the measurement target in the light projection measuring method, if the parallelism between the light projection direction and each face of the front and back sides of the measurement portion in the measurement target is not sufficient due to deflection or the like of the measurement target, correct shape measurement cannot be made in some cases (See FIG. 17).

Thus, it is preferable that the shape measuring device according to the present invention is provided with each constituent element shown in the following (6) and (7).

(6) Center sucking and supporting means for supporting the measurement target by sucking the center part on one of the faces.

(7) Parallel supporting means for supporting one of the faces of the measurement target in parallel with the light projection direction at a position on the center side with respect to the measurement portion in the measurement target supported by the center sucking and supporting means.

The parallel supporting means corrects inclination of each face of the front and back sides of the measurement portion with respect to the light projection direction.

According to the shape measuring device according to the present invention provided with the above configuration, the shape of the measurement portion at plural spots in the circumferential direction of the measurement target can be measured efficiently, and shape measurement can be made with high accuracy while parallelism between the light projection direction and each face of the front and back sides of the measurement portion is fully ensured.

Here, a more specific configuration of the parallel supporting means can be a configuration shown in any one of the following (8) to (10).

(8) The parallel supporting means supports the measurement target in point contact with one of the faces of the measurement target at plural positions on a straight line or a plane in parallel with the light projection direction. Hereinafter, the parallel supporting means is referred to as first parallel supporting means.

(9) The parallel supporting means supports the measurement target through contact with one of the faces of the measurement target along a straight line in parallel with the light projection direction. Hereinafter, the parallel supporting means is referred to as second parallel supporting means.

(10) The parallel supporting means supports the measurement target by sucking one of the faces of the measurement target on a plane in parallel with the light projection direction. Hereinafter, the parallel supporting means is referred to as third parallel supporting means.

According to the first parallel supporting means, a contact area of a supporting portion with the surface of the measurement target can be made small. On the other hand, according to the third parallel supporting means, a contact pressure of the supporting portion to the surface of the measurement target (pressing force per unit area) can be made small.

Also, the shape measuring device according to the present invention is more preferably provided with a constituent element shown in the following (11).

(11) Parallel supporting portion moving means for bringing close/separating the parallel supporting means to/from one of the faces of the measurement target.

As a result, if the measurement target is to be rotated while being supported by the center sucking and supporting means for switching of the measurement portion in the measurement target, the parallel supporting means can be retreated away from the measurement target, and damage on the measurement target can be prevented.

EFFECTS OF THE INVENTION

According to the present invention, when a shape of an end face of a disc-shaped measurement target such as a semiconductor wafer is to be measured on the basis of its projection image, a non-parallel light component is prevented from being contained in a light flux projected to the measurement target as much as possible, and correct shape measurement can be made by ensuring a parallel state between the light projection direction and each face of the front and back sides of the measurement target.

BRIEF DESCRIPTION OF DRAWINGS

FIGS. 6(a) and 6(b) are diagrams illustrating images in an image pickup range of a camera if the shape measuring device X is provided with the mask according to the first embodiment.

FIGS. 7(a) and 7(b) are diagrams illustrating images in an image pickup range of a camera if the shape measuring device X is provided with the mask according to the second embodiment.

FIGS. 8(a) and 8(b) are diagrams illustrating images in an image pickup range of a camera if the shape measuring device X is provided with the mask according to the third embodiment.

FIGS. 9(a)-9(c) are diagrams illustrating an outline configuration of a parallel supporting mechanism Y1 according to the first embodiment disposed in the shape measuring device X.

FIGS. 10(a)-10(c) are diagrams illustrating an outline configuration of a parallel supporting mechanism Y2 according to the second embodiment disposed in the shape measuring device X.

FIGS. 11(a)-11(c) are diagrams illustrating an outline configuration of a parallel supporting mechanism Y3 according to the third embodiment disposed in the shape measuring device X.

REFERENCE NUMERALS

Figure 1:
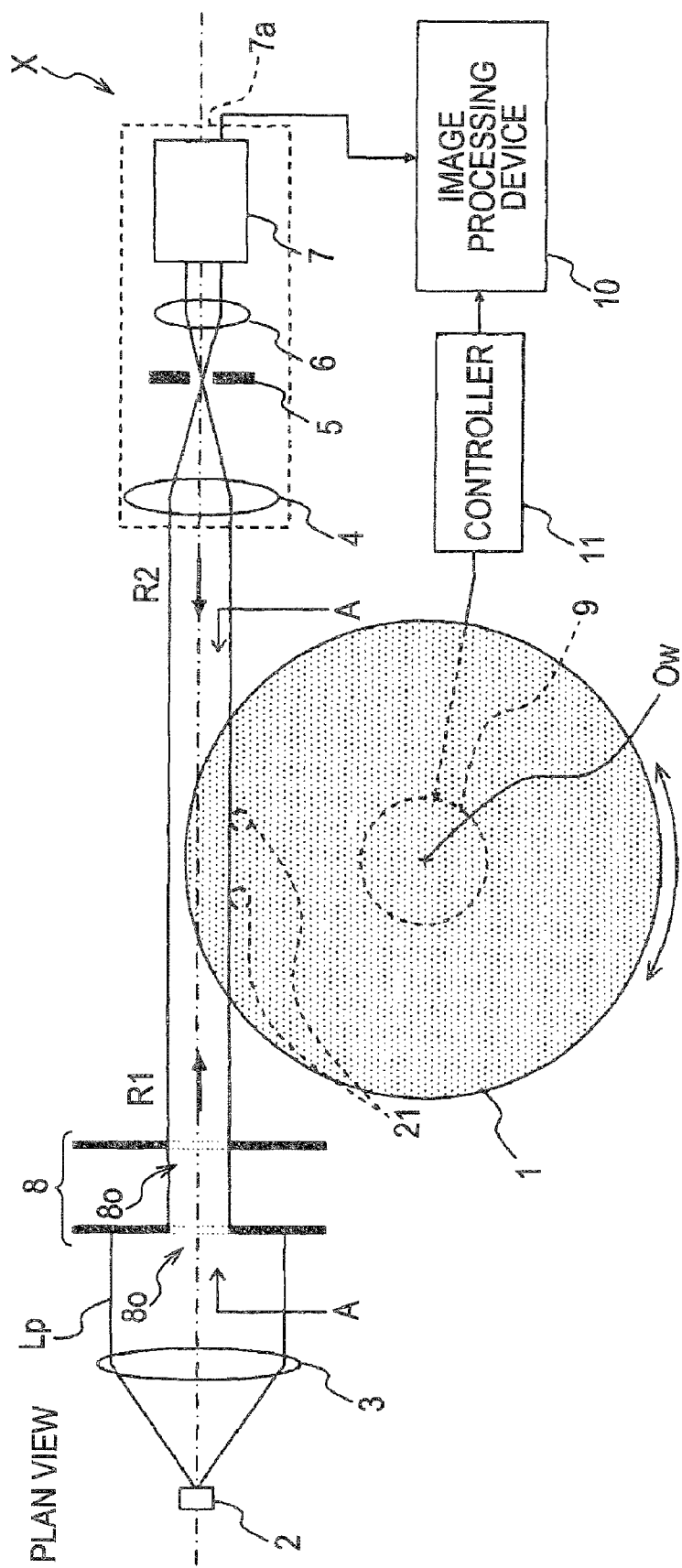
FIG. 1 is an outline plan view of a shape measuring device X according to an embodiment of the present invention.

X shape measuring device
1 wafer
2 point light source
3 collimator lens
4 first lens
5 diaphragm
6 second lens
7 image sensor
7a camera
8 mask
9 center sucking and supporting mechanism
10 image processing device
11 controller
21, 21', 21" parallel supporting portion
22 supporting base
23 elastic urging member
24 contact portion

BEST MODES FOR CARRYING OUT THE INVENTION

Embodiments of the present invention will be described below referring to the attached drawings and offered for understanding of the present invention. The embodiments below are examples obtained by embodying the present invention and do not limit the technical range of the present invention in its nature.

Figure 2:
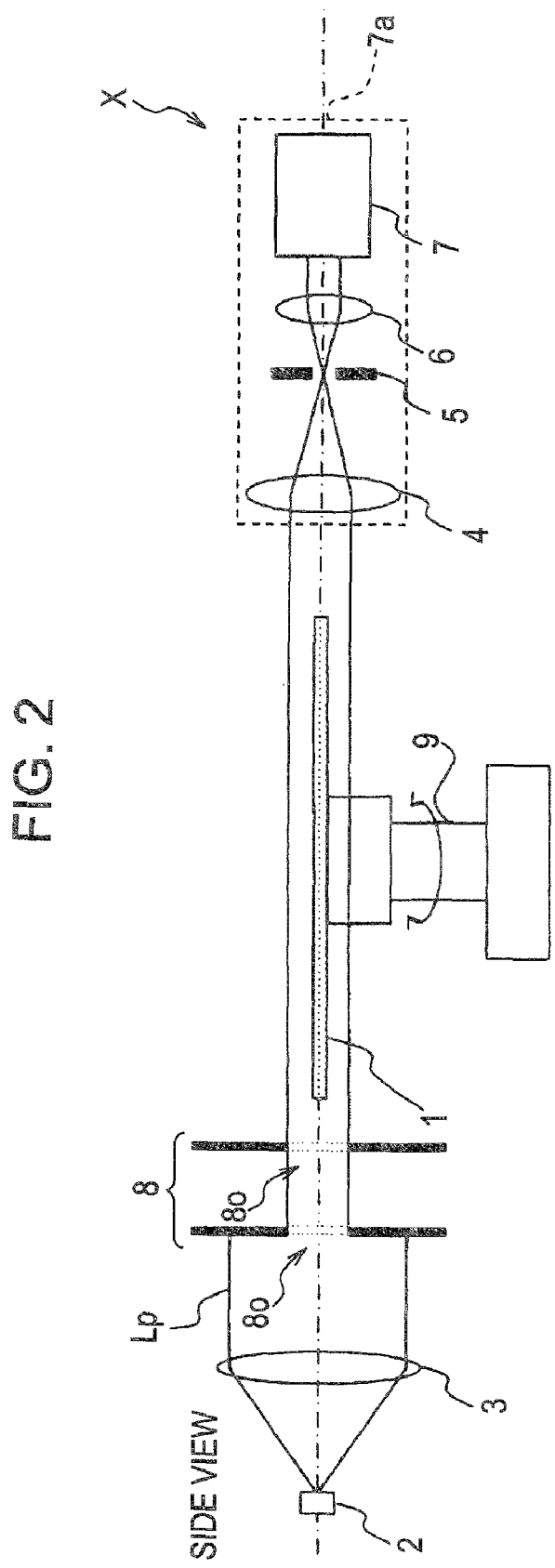
FIG. 2 is an outline side view of the shape measuring device X.
Figure 3:
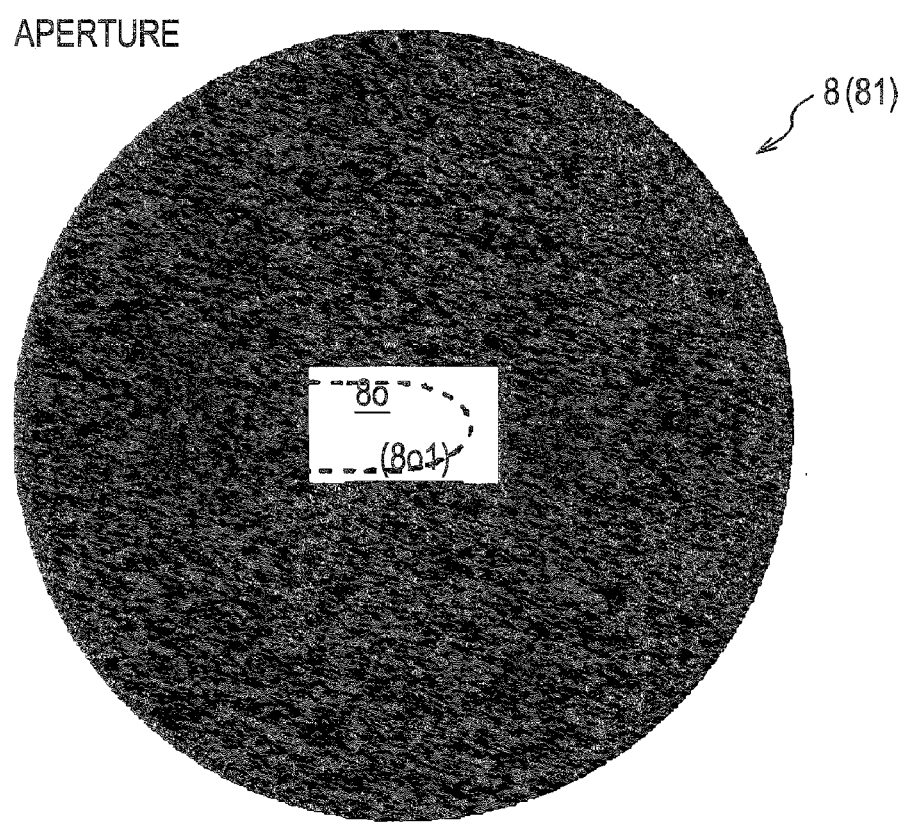
FIG. 3 is a front view of a mask according to a first embodiment disposed in the shape measuring device X.
Figure 4:
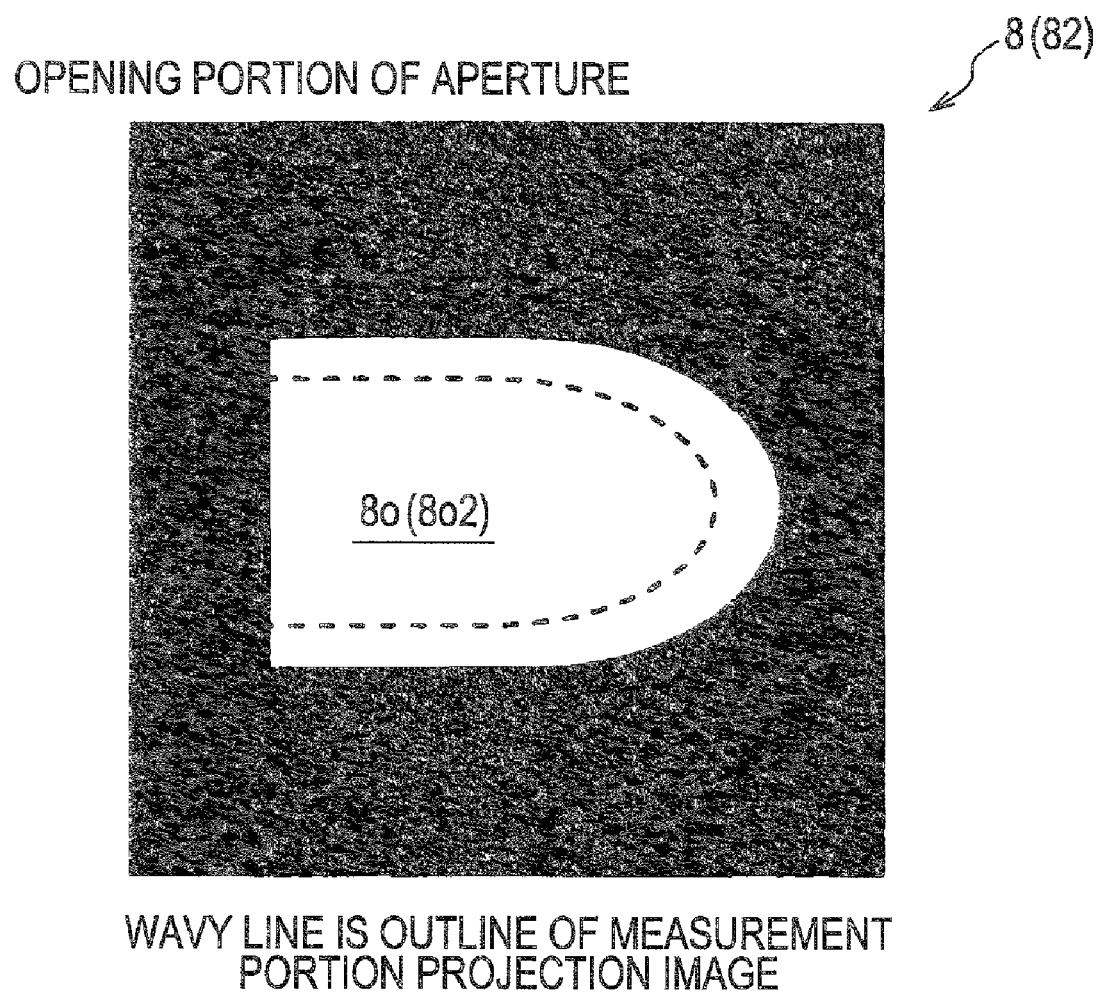
FIG. 4 is a diagram illustrating an opening portion of a mask according to a second embodiment disposed in the shape measuring device X.
Figure 5:
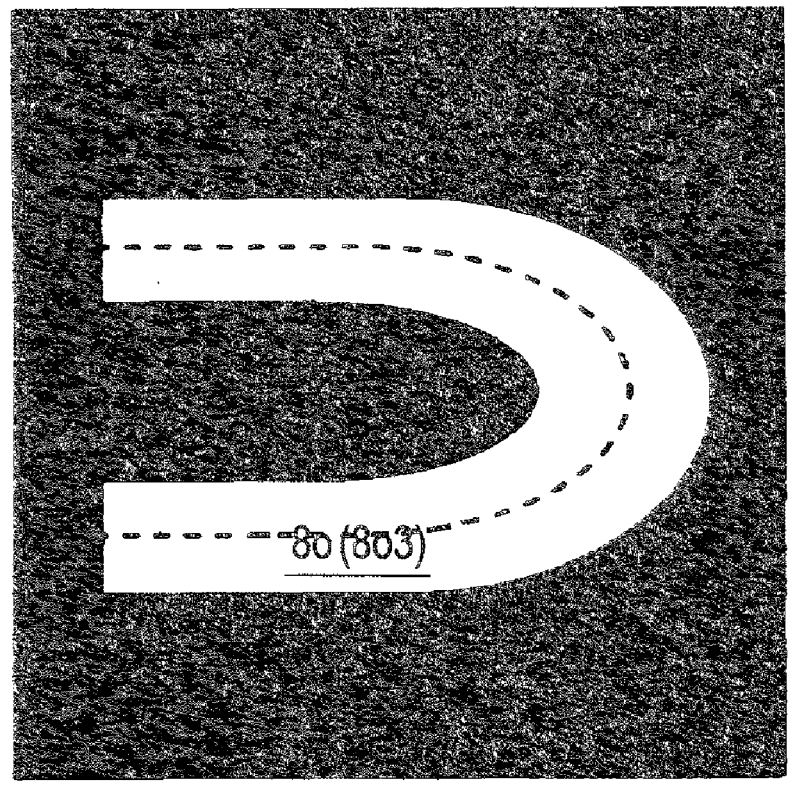
FIG. 5 is a diagram illustrating an opening portion of a mask according to a third embodiment disposed in the shape measuring device X.
Figure 12:
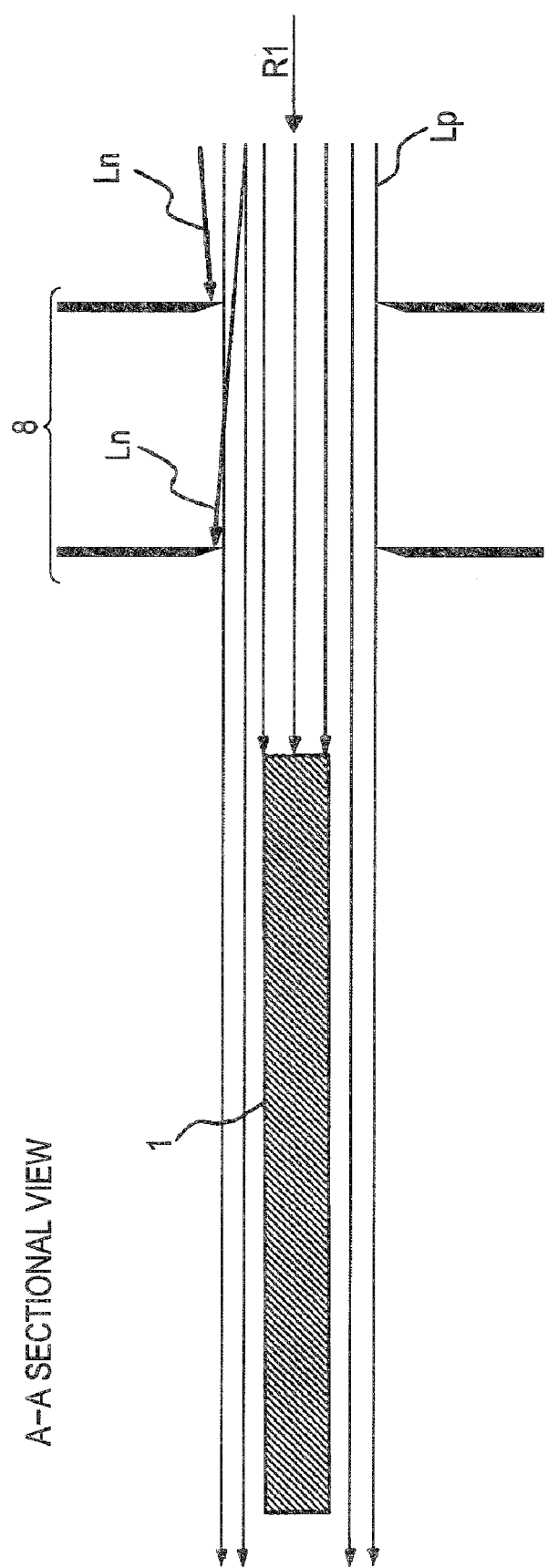
FIG. 12 is a first diagram schematically illustrating a path of a light beam projected to a measurement target in the shape measuring device X.
Figure 13:
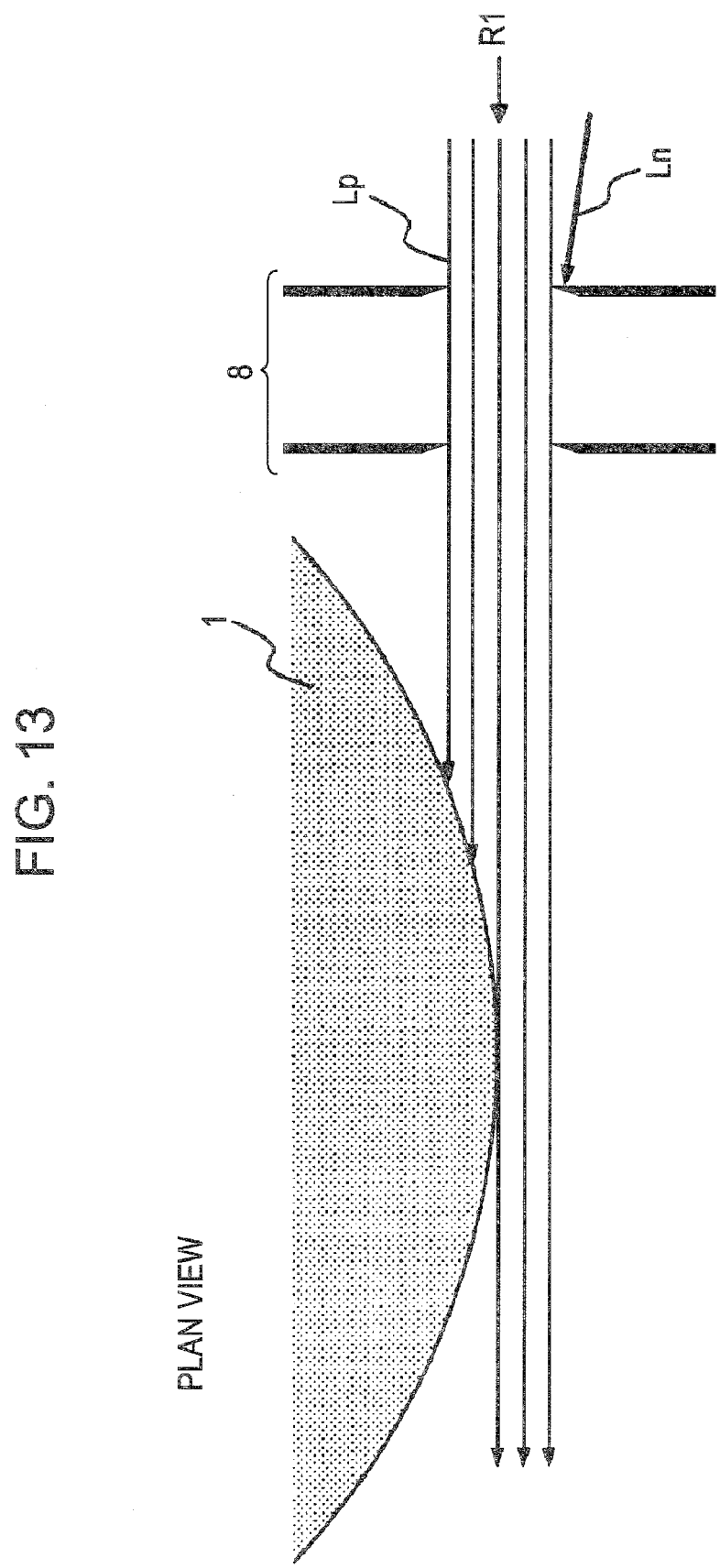
FIG. 13 is a second diagram schematically illustrating a path of a light beam projected to a measurement target in the shape measuring device X.
Figure 14:
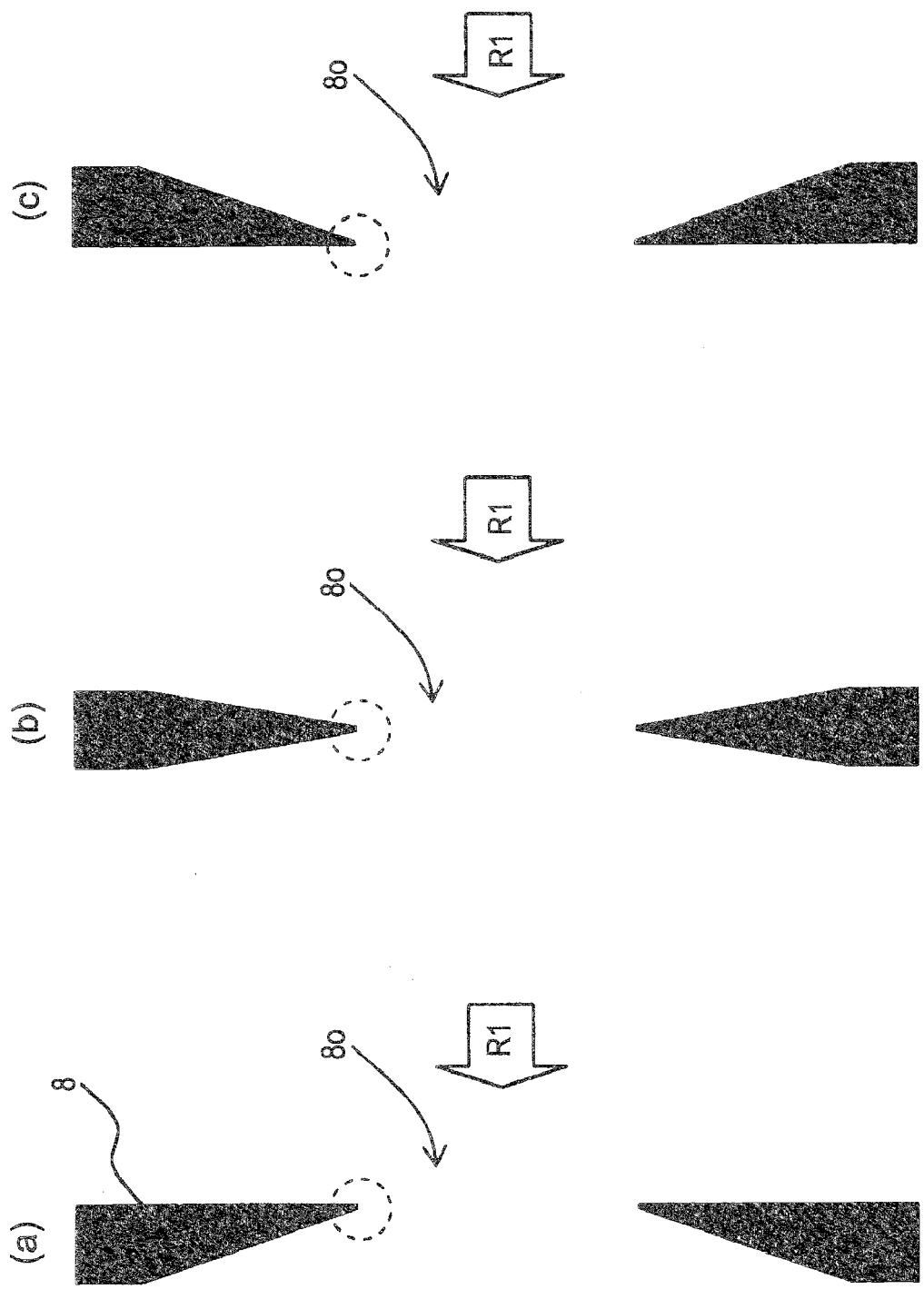
FIGS. 14(a)-14(c) are sectional views illustrating examples of the opening portion of the mask disposed in the shape measuring device X.
Figure 15:
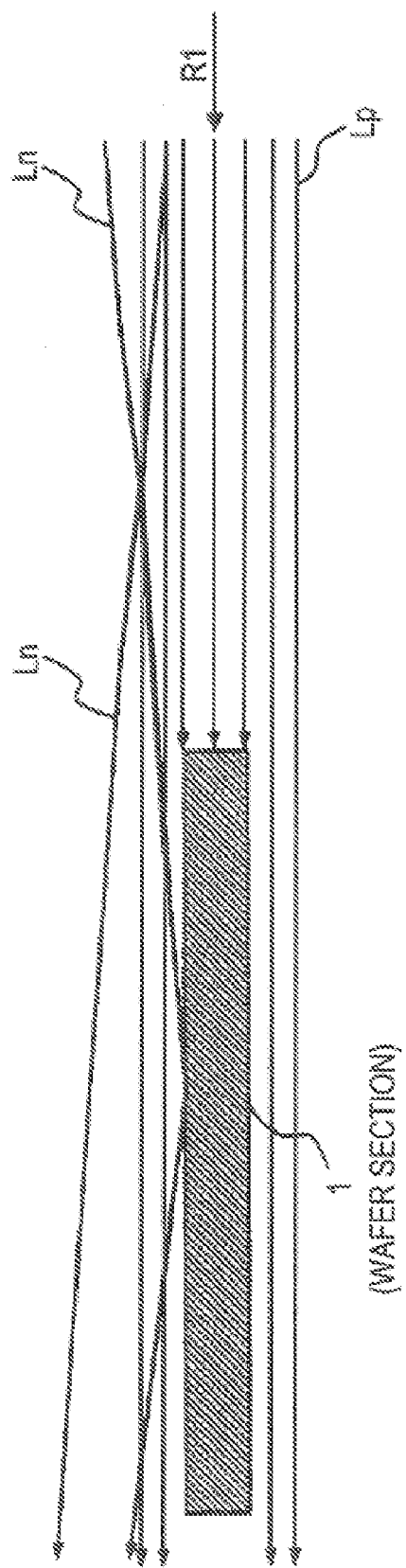
FIG. 15 is a first diagram schematically illustrating a path of a light beam if a non-parallel light component is contained in a light flux projected to a measurement target in a light projection measuring method.
Figure 16:
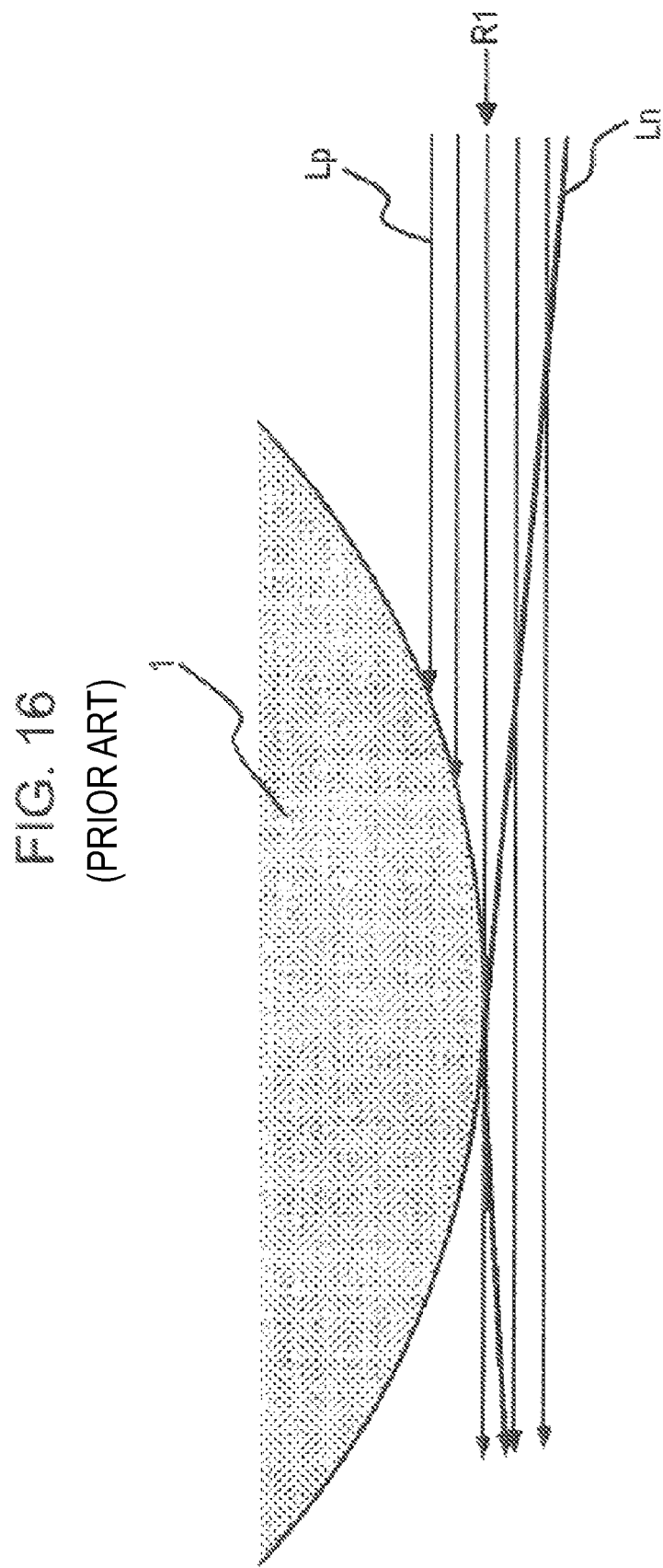
FIG. 16 is a second diagram schematically illustrating a path of a light beam if the non-parallel light component is contained in the light flux projected to the measurement target in the light projection measuring method.
Figure 17:
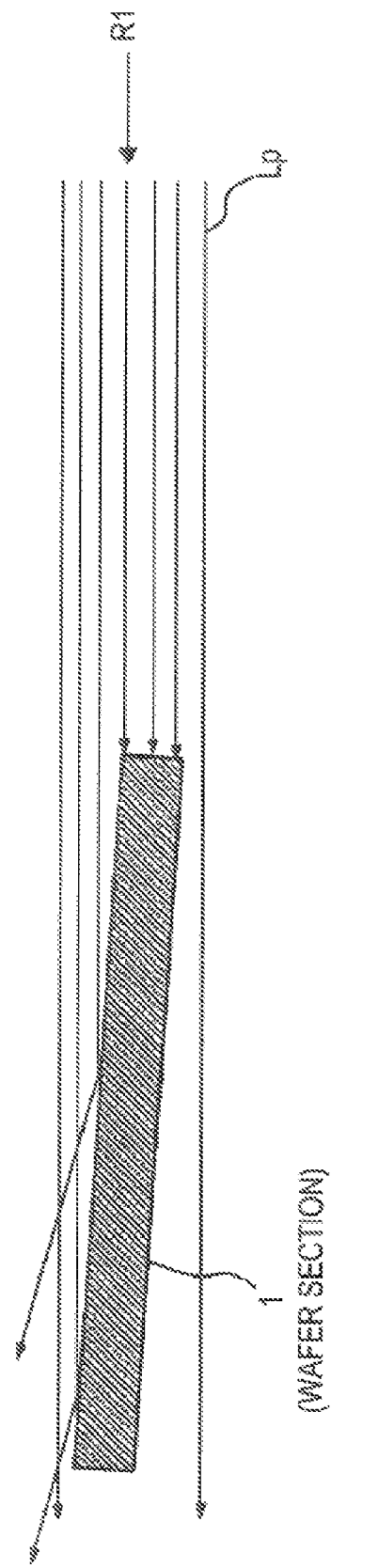
FIG. 17 is a diagram schematically illustrating a path of a light beam if inclination is generated between a light projection direction to the measurement target and each face of the front and back sides of the measurement portion in the light projection measuring method.

Here, FIG. 1 is an outline plan view of a shape measuring device X according to an embodiment of the present invention, FIG. 2 is an outline side view of the shape measuring device X, FIG. 3 is a front view of a mask according to a first embodiment disposed in the shape measuring device X, FIG. 4 is a diagram illustrating an opening portion of a mask according to a second embodiment disposed in the shape measuring device X, FIG. 5 is a diagram illustrating an opening portion of a mask according to a third embodiment disposed in the shape measuring device X, FIG. 6 are diagrams illustrating images in an image pickup range of a camera if the shape measuring device X is provided with the mask according to the first embodiment, FIG. 7 are diagrams illustrating images in an image pickup range of a camera if the shape measuring device X is provided with the mask according to the second embodiment, FIG. 8 are diagrams illustrating images in an image pickup range of a camera if the shape measuring device X is provided with the mask according to the third embodiment, FIG. 9 are diagrams illustrating an outline configuration of a parallel supporting mechanism Y1 according to the first embodiment disposed in the shape measuring device X, FIG. 10 are diagrams illustrating an outline configuration of a parallel supporting mechanism Y2 according to the second embodiment disposed in the shape measuring device X, FIG. 11 are diagrams illustrating an outline configuration of a parallel supporting mechanism Y3 according to the third embodiment disposed in the shape measuring device X, FIG. 12 is a first diagram schematically illustrating a path of a light beam projected to a measurement target in the shape measuring device X, FIG. 13 is a second diagram schematically illustrating a path of a light beam projected to a measurement target in the shape measuring device X, FIG. 14 are sectional views illustrating examples of the opening portion of the mask disposed in the shape measuring device X, FIG. 15 is a first diagram schematically illustrating a path of a light beam if a non-parallel light component is contained in a light flux projected to a measurement target in a light projection measuring method, FIG. 16 is a second diagram schematically illustrating a path of a light beam if the non-parallel light component is contained in the light flux projected to the measurement target in the light projection measuring method, and FIG. 17 is a diagram schematically illustrating a path of a light beam if inclination is generated between a light projection direction to the measurement target and each face of the front and back sides of the measurement portion in the light projection measuring method.

The shape measuring device X according to the present invention is a device for projecting light by a light projecting portion from a direction parallel with each face of the front and back sides of a wafer 1 to a chamfered end portion of the wafer 1 (semiconductor wafer), which is a disc-shaped measurement target, picking up a projection image of the end portion of the wafer 1 (hereinafter, referred to as a measurement portion) by a camera 7a from a direction opposite the light projection direction, and measuring a shape and a thickness of the end face of the wafer 1 on the basis of the projection image.

The wafer 1 is made of a semiconductor such as silicon or the like with a radius of approximately 150 [mm] and a thickness of approximately 0.8 [mm] and its outer peripheral end (circumferential face) portion is chamfered.

Referring to the plan view shown in FIG. 1 and the side view shown in FIG. 2, a configuration of the shape measuring device X will be explained. In FIG. 2, a part of constituent elements shown in FIG. 1 are omitted.

As shown in FIGS. 1 and 2, the shape measuring device X is provided with a point light source 2 as a light projecting portion, which is an optical system for light projection (an example of light projecting means), a collimator lens 3 for making light of the point light source 2 parallel light, and a mask 8.

The point light source 2 is a light source or the like emitting light of a white LED through a pinhole with a diameter of approximately 300 to 400 μm, for example. A light emitting portion (pin hole) of the point light source 2 is arranged at a focus position of the collimator lens 3.

The collimator lens 3 is a lens for collimating (making light parallel) outgoing light of the point light source 2 in a direction toward the measurement portion of the wafer 1 and a direction in parallel with the both front and back faces (light projection direction) in the measurement portion while having the light pass.

The mask 8 is a plate-shaped member in which an opening portion 8o is formed and shields passage of a part of a light flux by having the light flux from the collimator lens 3 to the wafer 1 side pass through the opening portion 8o. The details will be described later. The shape measuring device X shown in FIGS. 1 and 2 is provided with two pieces of the mask 8, but the mask 8 may be provided in only one or three or more.

The light flux of the parallel light after passing through the mask 8 is projected to the measurement portion (edge portion) including the end face of the wafer 1 from a direction R1 in parallel with each face of the front and back sides of the wafer 1.

Moreover, the shape measuring device X is provided with a lens portion provided with a first lens 4 and a second lens 6 as the camera 7a (corresponding to image pickup means) for picking up a projection image of the measurement portion (edge portion) including the end face of the wafer 1 from a direction R2 opposite the light projection direction R1 to the wafer 1, a diaphragm 5 incorporated in the lens portion, and an image sensor 7 (CCD or the like).

The first lens 4, the second lens 6, and the diaphragm 5 constitute a telecentric lens, and light having passed it is inputted to the image sensor 7, by which a projection image of the measurement portion (edge portion) of the wafer 1 is picked up.

An interval (distance) between the mask 8 (the closest to the wafer 1) and the first lens 4 is set at approximately 200 [mm], for example, and the edge portion of the wafer 1 is arranged in an optical path of the light flux (parallel light) between them.

As mentioned above, with the shape measuring device X, by projecting parallel light to the wafer 1, even if the wafer 1 has a large depth length in the optical axis direction (light projection direction R1) of the parallel light, a favorable projection image with less blurring of the outline in the image sensor 7 can be obtained. Also, by employing the point light source 2 using not a single wavelength light with strong interference but a white LED having a multiwavelength component, even if the wafer 1 has a large depth length in the light projection direction R1, a favorable picked-up image with less diffraction fringes generated in the neighborhood of the outline of the projection image in the image sensor 7 can be obtained.

The shape measuring device X is further provided with a center sucking and supporting mechanism 9, an image processing device 10, a controller 1, and a parallel supporting portion 21.

The image processing device 10 is an arithmetic device for executing image processing on the basis of a picked-up image (image containing a projection image of the wafer 1) by the image sensor 7 such as a DSP (Digital Signal Processor), and a personal computer, for example, for executing a predetermined program stored in a storage portion thereof in advance. This image processing device 10 calculates an index value of an end-face shape of the wafer 1 by executing image processing determined in advance for the picked-up image (projection image) by the image sensor 7. The image processing device 10 executes an input of the picked-up image (image data) by the image sensor 7 and image processing on the basis of the picked up image according to a control command from a controller 11.

Also, the center sucking and supporting mechanism 9 supports one of the faces (a lower face, for example) of the disc-shaped wafer 1 by vacuuming the center part thereof. Moreover, the center sucking and supporting mechanism 9 is also a device for making adjustment concerning at which position in the circumferential direction of the wafer 1 the end portion is to be positioned as the measurement portion in an optical path of a light flux by rotating/driving and stopping the wafer 1 in the circumferential direction using the center part (center Ow) as a rotation axis. The center sucking and supporting mechanism 9 is provided with a rotation encoder, not shown, as an angle detection sensor for detecting a supporting angle (rotation angle) of the wafer 1 and positions a supporting position (supporting angle) of the wafer 1 on the basis of the detected angle. The center sucking and supporting mechanism 9 positions the supporting position of the wafer 1 according to the control command from the controller 11.

The controller 11 is a calculating machine provided with a CPU and its peripheral devices and controls (outputs a control command) the image processing device 10 and the center sucking and supporting mechanism 9 when the CPU executes a control program stored in advance in the storage portion.

Subsequently, referring to FIGS. 3 to 8, an embodiment of the mask 8 provided in the shape measuring device X will be described. FIG. 3 is a front view of a mask 81 according to a first embodiment and FIGS. 4 and 5 are diagrams of opening portions 8$o$2 and 8$o$3 of masks 82 and 83 according to a second embodiment and a third embodiment, respectively. Also, FIGS. 6 to 8 are diagrams illustrating images in an image pickup range (images seen from a direction R2) of the image sensor 7 (camera 7$a$) if the masks 81 to 83 according to the first to third embodiments are provided, respectively. Also, wavy lines shown in FIGS. 3 to 5 indicate outline shapes of a projection image 1' of the measurement portion. Also, in FIGS. 6 to 8, shaded portions indicate areas where light is shielded by the masks 8 (81 to 83).

The image pickup range refers to a range corresponding to an entire image area of the picked-up image by the camera 7$a$, that is, a range corresponding to an entire image area which can be a target of image processing for shape measurement (entire image area of the image data obtained from the image sensor 7) (a range inside an outline 71 in FIGS. 6 to 8).

The mask 81 according to the first embodiment has an opening portion 8$o$1 with the same rectangular shape as that of the outline 71 of the image pickup range and shields passage of a light flux in a range outside the opening portion 8$o$1.

For example, with regard to the opening portion 8$o$1 of the mask 81, as shown in FIG. 6($a$), its outline 72 might match the outline 71 of the image pickup range. In this case, the mask 81 shields passage of the light in the light flux traveling from the collimator lens 3 to the wafer 1 side in a range outside the outline 71 of the image pickup range of the camera 7$a$ when seen from the light projection direction R1, that is, a shaded area in FIG. 6 (hereinafter referred to as a range outside image pickup).

Also, with regard to the opening portion 8$o$1 of the mask 81, as shown in FIG. 6($b$), the outline 72 might be located in a range inside the outline 71 of the image pickup range and outside the projection image 1' of the measurement portion. In this case, the mask 81 shields passage of the light a range inside the image pickup range and outside a boundary (the outline 72 of the opening portion 8$o$1) located in a range outside the projection image 1' of the measurement portion in the light projection direction R1.

Therefore, the mask 81 also shields passage of the light in the light flux traveling from the collimator lens 3 to the wafer 1 side in a range inside the outline 71 of the image pickup range and with a distance from the outline of the projection image of the measurement portion in the light projection direction R1, that is, a vertical line area (an example of the edge portion range inside image pickup) in FIG. 6($b$), in addition to the range outside the image pickup (shaded area).

Also, the mask 82 according to the second embodiment has the opening portion 8$o$2 (See FIG. 4) with an outline shape substantially equal to a shape enlarged from the outline shape of the projection image 1' of the measurement portion in the light projection direction R1 (the shape similar to the outline shape of the projection image 1') and shields passage of the light flux in the range outside the opening portion 8$o$2.

For example, with regard to the opening portion 8$o$2 of the mask 82, as shown in FIGS. 7($a$) and ($b$), its outline 72 is located in a range inside the outline 71 of the image pickup range and outside the projection image 1' of the measurement portion. As a result, the mask 82 shields passage of the light in a range inside the image pickup range and outside a boundary (the outline 72 of the opening portion 8$o$2) located in a range outside the projection image 1' of the measurement portion in the light projection direction R1.

Therefore, the mask 82 shields passage of the light in the light flux traveling from the collimator lens 3 to the wafer 1 side in a range inside the outline 71 of the image pickup range and with a distance from the outline of the projection image 1' of the measurement portion in the light projection direction R1, that is, a vertical line area (hereinafter referred to as an edge portion range inside the image pickup) in FIGS. 7($a$) and 7($b$), in addition to the range outside the image pickup (shaded area).

Also, the mask 83 according to the third embodiment has the opening portion 8$o$3 (See FIG. 5) formed in a band shape curved in the U-shape along the outline of the projection image 1' of the measurement portion in the light projection direction R1 and shields passage of the light flux in a range outside the opening portion 8$o$3.

As a result, the mask 83 shields, as shown in FIG. 8, passage of the light in the light flux passing through the collimator lens 3 and traveling to the wafer 1 side in the range outside the image pickup (shaded area), in the edge portion range inside the image pickup (vertical line area), and a part of the range (corresponding to the range inside the projection image) inside the projection image 1' of the measurement portion in the light projection direction R1.

Subsequently, referring to FIGS. 12 and 13, a path of a light beam projected to the wafer 1 (measurement target) in the shape measuring device X will be described. FIG. 12 is a diagram (diagram of an A-A section in FIG. 1) of a section in the end portion of the wafer 1 (measurement portion) seen from a direction perpendicular to the section (radial direction of the wafer 1) and FIG. 13 is a diagram of the end portion of the wafer 1 (measurement portion) seen from a direction perpendicular to the front and back faces.

As mentioned above, if the non-parallel light component Ln is contained in the light flux having passed through the collimator lens 3, the non-parallel light component Ln passes through a position relatively largely departed from the range of the projection image of the wafer 1 in a process to the wafer 1 in many cases. However, in the shape measuring device X, as shown in FIGS. 12 and 13, in the process from the collimator lens 3 to the wafer 1, passage of the light at a position relatively largely departed from the range of the projection image of the wafer 1 is shielded by the mask 8, and the non-parallel light component Ln can be prevented from being contained in the light flux projected to the wafer 1 as much as possible.

Also, there can be such a situation in which a non-parallel light component passing through a position within a range of the projection image of the wafer 1 and then, reaching a light receiving range of the camera 7a away from the position of the wafer 1 in the process to the wafer 1 is contained in the light flux after passing through the collimator lens 3. Even in such a case, if the shape measuring device X is provided with the mask 83 according to the third embodiment, the non-parallel light component Ln can be eliminated from the light flux projected to the wafer 1 more reliably.

Also, since the plurality of masks 8 are arranged with an interval along the light projection direction R1, the non-parallel light component Ln having passed through the mask 8 on the front stage (upstream side in the light projection direction R1) is likely shielded by the mask 8 on the rear stage. Therefore, the non-parallel light component Ln can be eliminated more reliably if the masks 8 are arranged in plural along the light projection direction R1 rather than if only one mask is provided.

Here, the plurality of masks 8 having the opening portions 8o with the same shape and size formed therein are arranged so that the opening portions 8o are fully overlapped when seen from the light projection direction R1 in general. However, the plurality of masks 8 may have different sizes and shapes. In that case, with regard to the plurality of masks 8, the portion where the opening portions 8o are overlapped with each other when seen from the light projection direction R1 might have a configuration satisfying requirements of the shapes of the opening portions 8o1 to 8o3 exemplified in FIGS. 3 to 8.

FIGS. 14 are examples of sectional views containing the opening portion 8o in the mask 8 in a part of the light projection direction R1.

Examples shown in FIGS. 14(a) to 14(c) illustrate that one of or both of a face on the upstream side and a face on the downstream side in the light projection direction R1 in the edge portion of the opening portion 8o in the mask 8 are formed in a tapered shape. As a result, the edge portion of the opening portion 8o becomes a shape in which a top portion (portion in a wave lined frame) is formed in the section of the light projection direction R1. As in the examples shown in FIGS. 14(a) to 14(c), it is preferable that the edge portion of the opening portion 8o in the mask 8 is formed with a thickness in the light projection direction R1 as thin as possible and a plane along the light projection direction R1 is not formed. As a result, the light flux traveling toward the wafer 1 can be prevented from being reflected by the edge portion while passing through the opening portion 8o of the mask 8 and badly affecting measurement.

Also, the mask 8 can be a plate-shaped member made of aluminum applied with black alumite treatment on the surface or a plate-shaped member applied with fabric raising treatment on the surface. As a result, the light shielded by the mask 8 is prevented from being reflected and badly affecting measurement.

Also, the mask 8 can be provided with a displacement mechanism (such as a slide mechanism, for example) capable of displacing the edge portion (light shielding portion) of the opening portion 8o in a direction orthogonal to the light projection direction R1. As a result, the shape or size of the opening portion 8o can be changed according to the shape or size of the measurement portion, which is preferable.

Also, the one or plurality of masks 8 can be arranged both in the optical path of the light flux from the collimator lens 3 to the wafer 1 and in the optical path of the light flux from the wafer 1 to the camera 7a.

As a result, even if a component of a part of the light flux having reached the wafer 1 is reflected by the surface of the wafer 1, the reflection light is prevented from being mixed in the image pickup range of the camera 7a and badly affecting shape measurement.

When the shape measurement is to be made by the shape measuring device X for the measurement portions at a plurality of spots in the circumferential direction of the wafer 1, efficient measurement can be made by rotating the wafer 1 while sucking and supporting the center part thereof by the center sucking and supporting mechanism 9 and positioning the wafer 1 thereby.

However, as shown in FIG. 17, if parallelism between the light projection direction R1 and each face of the front and back sides of the measurement portion is not sufficient due to deflection of the wafer 1 or the like, even if the non-parallel light component Ln is fully eliminated from the light flux projected to the wafer 1, correct shape measurement cannot be made in some cases.

Then, the shape measuring device X is provided with a parallel supporting mechanism Y including the parallel supporting portion 21 supporting one of the faces of the wafer 1 in parallel with the light projection direction R1 and its moving mechanism at a position on the center side with respect to the measurement portion in the wafer 1 supported by the center sucking and supporting mechanism 9.

Embodiments (a first embodiment to a third embodiment) of the parallel supporting mechanism Y disposed in the shape measuring device X will be described referring to FIGS. 9 to 11.

First, referring to FIG. 9, a parallel supporting mechanism Y1 according to the first embodiment will be described. FIG. 9(a) is a diagram of the parallel supporting mechanism Y1 in a state supporting the wafer 1 seen from the direction R2 opposing the light projection direction R1, FIG. 9(b) is a diagram seen from a direction (radial direction of the wafer 1) orthogonal to the light projection direction R1, and FIG. 9(c) is a diagram of the parallel supporting mechanism Y1 in a state separated from the wafer 1 seen from a direction orthogonal to the light projection direction R1.

The parallel supporting mechanism Y1 is provided with the parallel supporting portion 21 for supporting one of the faces of the wafer 1 in parallel with the light projection direction R1 at a position on the center side the closest to the measurement portion (portion surrounded by a wavy line 8a in FIGS. 9 to 11) in the wafer 1 supported by the center sucking and supporting mechanism 9. Here, the supporting position by the parallel supporting mechanism Y1 is preferably outside the image pickup range (the closest on the center side) of the camera 7a in the wafer 1. The parallel supporting portion 21 in the first embodiment has its supporting portion (distal end) formed in a semispherical shape and supports the measurement target in point contact at a plurality of positions (2 spots in the example shown in FIG. 9) on a straight line parallel with the light projection direction R1 with respect to one of the faces of the wafer 1. The parallel supporting portion 21 corrects inclination of each face of the front and back sides of the measurement portion with respect to the light projection direction R1.

For example, the parallel supporting portion 21 is provided so as to press the surface of the wafer 1 by arranging a supporting position (position of the distal end) in a direction perpendicular to each face of the front and back sides of the wafer 1 with slight displacement (approximately 0.1 to 0.2 mm, for example) with respect to the supporting position (position of a sucking portion) of the center sucking and supporting mechanism 9.

By supporting the wafer 1 by the parallel supporting portion 21, shape measurement with high accuracy can be made by fully ensuring the parallelism between the light projection direction R1 and each face of the front and back sides of the measurement portion. Also, according to this parallel supporting portion 21, a contact area with the surface of the wafer 1 can be reduced.

The parallel supporting portion 21 can support the wafer 1 in point contact at three or more positions (3-point support, for example) on a plane parallel with the light projection direction R1 with respect to one of the faces of the wafer 1.

Moreover, the parallel supporting mechanism Y1 is provided with a moving mechanism for bringing close/separating the parallel supporting portion 21 to/from one of the faces (supporting face) of the wafer 1 (one example of the parallel supporting portion moving means).

The moving mechanism is provided with a supporting base 22, an elastic urging member 23, a contact portion 24, and an actuator, not shown, for example.

The supporting base 22 is a member to which the parallel supporting portion 21 is fixed for supporting the same, and the contact portion 24 is a portion fixed to a predetermined position and brought into contact with the supporting base 22. Also, the elastic urging member 23 (spring, rubber and the like) is to elastically urge the supporting base 22 in a direction of the contact portion 24, and the actuator is to switch the supporting base 22 between a state displaced in a direction to be separated from the contact portion 24 (state displaced against an urging force of the elastic urging member 23) and a state in which the displacement is released according to a control command from the controller 11.

By bringing the supporting base 22 into contact with the contact portion 24 by the urging force of the elastic urging member 23, the parallel supporting portion 21 is positioned so that the plurality of supporting portions (distal ends) are aligned on a straight line parallel with the light projection direction R1.

By means of this moving mechanism, when the wafer 1 is to be rotated by the center sucking and supporting mechanism 9 for switching of the measurement portion in the wafer 1, the parallel supporting portion 21 can be retreated away from the wafer 1, and damage on the wafer 1 (damage caused by abrasion with the parallel supporting portion 21) can be prevented.

The moving mechanism illustrated above uses the urging force of the elastic urging member 23. However, the moving mechanism can be a mechanism for bringing close/separating the parallel supporting portion 21 to/from one of the faces (supporting face) of the wafer 1 by positioning the parallel supporting portion 21 with the actuator such as an air cylinder, an electric cylinder and the like.

Subsequently, a parallel supporting mechanism Y2 according to the second embodiment will be described referring to FIG. 10. However, the parallel supporting mechanism Y2 is also provided with the moving mechanism disposed in the parallel supporting mechanism Y1, but description of the moving mechanism is omitted in FIG. 10. FIG. 10($a$) is a diagram of the parallel supporting mechanism Y2 in a state supporting the wafer 1 seen from the direction R2 opposing the light projection direction R1, and FIG. 10($b$) is a diagram seen from a direction (radial direction of the wafer 1) orthogonal to the light projection direction R1. Also, FIG. 10($c$) is a diagram of the parallel supporting mechanism Y2 seen from a direction perpendicular to each face of the front and back sides of the wafer 1.

A parallel supporting portion 21' (corresponding to the parallel supporting portion 21) disposed in the parallel supporting mechanism Y2 has a distal end portion with a semicircular section forming a ridge line extending in a straight direction parallel with the light projection direction R1. The parallel supporting portion 21' supports the wafer 1 by bringing its distal end portion into contact with one of the faces of the wafer 1 along the straight line parallel with the light projection direction R1 at a position on the center side the closest to the measurement portion in the wafer 1 supported by the center sucking and supporting mechanism 9.

By supporting the wafer 1 by the parallel supporting portion 21', shape measurement with high accuracy can be made while parallelism between the light projection direction R1 and each face of the front and back sides of the measurement portion is fully ensured. Also, according to the parallel supporting portion 21', a contact area with the surface of the wafer 1 can be made relatively small, and a contact pressure (pressing force per unit area) to the surface of the wafer 1 can be also made relatively small.

Subsequently, a parallel supporting mechanism Y3 according to the third embodiment will be described referring to FIG. 11. However, the parallel supporting mechanism Y3 is also provided with the moving mechanism disposed in the parallel supporting mechanism Y1, but description of the moving mechanism is omitted in FIG. 11. FIG. 11($a$) is a diagram of the parallel supporting mechanism Y3 in a state supporting the wafer 1 seen from the direction R2 opposing the light projection direction R1, and FIG. 11($b$) is a diagram seen from a direction (radial direction of the wafer 1) orthogonal to the light projection direction R1. Also, FIG. 11($c$) is a diagram of the parallel supporting mechanism Y3 seen from a direction perpendicular to each face of the front and back sides of the wafer 1.

In a parallel supporting portion 21" (corresponding to the parallel supporting portion 21) disposed in the parallel supporting mechanism Y3, a large number of air holes 21$a$ for air suction are provided in the planar distal end portion, and the wafer 1 is supported by vacuuming one of the faces of the wafer 1 with a plane parallel with the light projection direction R1 at a position on the center side the closest to the measurement portion in the wafer 1 supported by the center sucking and supporting mechanism 9.

By supporting the wafer 1 by the parallel supporting portion 21", shape measurement with high accuracy can be made while parallelism between the light projection direction R1 and each face of the front and back sides of the measurement portion is fully ensured. Also, according to the parallel supporting portion 21", a contact pressure (pressing force per unit area) to the surface of the wafer 1 can be made small. Also, since the parallel supporting portion 21" forcedly sucks the face of the wafer 1, its force for correcting inclination of the wafer 1 is high.

INDUSTRIAL APPLICABILITY

The present invention can be used for shape measurement of an end face mainly of a semiconductor wafer and other disc-shaped measurement targets such as an aluminum substrate for hard disk, a glass substrate and the like.

The invention claimed is:

1. A shape measuring device comprising:
light projecting means for projecting a light flux to a measurement portion, which is an end portion of a disc-shaped measurement target, from a direction parallel with each face of front and back sides of said measurement target and image pickup means for picking up a projection image of said measurement portion from a direction opposing the light projection direction,
said light projecting means including:
a point light source;
a collimator lens for having outgoing light of said point light source pass and collimating the same in said light projection direction; and
a single or a plurality of masks for shielding passage of a part of the light flux traveling from said collimator lens toward said measurement target side and shielding the passage of the light in a range outside image pickup, which is a range outside an outline of an image pickup range of said image pickup means seen from said light projection direction, wherein
a shape of the end face of said measurement target is measured on the basis of said projection image obtained by said image pickup means,
wherein said shape measuring device further comprises:
center sucking and supporting means for supporting said measurement target by sucking a center part of one of faces thereof; and
parallel supporting means for supporting one of the faces of said measurement target at a position on the center side with respect to said measurement portion in said measurement target supported by said center sucking and supporting means in parallel with said light projection direction.

2. The shape measuring device according to claim 1, wherein
in the light flux passing through said collimator lens and travelling toward said measurement target side, said mask shields passage of the light also in a range inside a projection image, which is a part of the range inside the projection image of said measurement portion in said light projection direction.

3. The shape measuring device according to claim 1, wherein
in the light flux passing through said collimator lens and travelling toward said measurement target side, said mask shields passage of the light also in an edge portion range inside image pickup, which is a range inside the outline of said image pickup range and with a distance from the outline of the projection image of said measurement portion in said light projection direction.

4. The shape measuring device according to claim 1, wherein
said mask is a plate-shaped member arranged between said collimator lens and said measurement target and having an opening portion formed in said image pickup range and shields passage of the light flux in a range outside the opening portion.

5. The shape measuring device according to claim 4, wherein
said mask shielding passage of the light in said range out of image pickup, said range inside said projection image, and said edge portion range inside image pickup has said opening portion formed in a curved band shape along the outline of the projection image of said measurement portion in said light projection direction and shields passage of the light flux in a range outside the opening portion.

6. The shape measuring device according to claim 1, wherein
said parallel supporting means supports said measurement target in point contact with one of the faces of said measurement target at a plurality of positions on a straight line or a plane parallel with said light projection direction.

7. The shape measuring device according to claim 1, wherein
said parallel supporting means supports said measurement target by being brought into contact with one of the faces of said measurement target along a straight line parallel with said light projection direction.

8. The shape measuring device according to claim 1, wherein
said parallel supporting means supports said measurement target by sucking one of the faces of said measurement target on a plane parallel with said light projection direction.

9. The shape measuring device according to claim 1, further comprising
parallel supporting portion moving means for bringing close/separating said parallel supporting means to/from one of the faces of said measurement target.

* * * * *